United States Patent [19]

Foye et al.

[11] Patent Number: 4,634,471

[45] Date of Patent: Jan. 6, 1987

[54] PIGMENT PRODUCT

[75] Inventors: Thomas E. Foye; Edward K. Sasamoto, both of Holland, Mich.

[73] Assignee: BASF Corporation, Wyandotte, Mich.

[21] Appl. No.: 728,236

[22] Filed: Apr. 29, 1985

[51] Int. Cl.$^4$ .................. C08L 91/00; C04B 14/00
[52] U.S. Cl. .................. 106/262; 106/288 R
[58] Field of Search ................ 106/262, 288

[56] References Cited

U.S. PATENT DOCUMENTS 2,525,835 10/1950 Schmutzler et al. ............ 106/262
4,340,431 7/1982 Arora et al. .................. 106/262

Primary Examiner—Theodore Morris
Attorney, Agent, or Firm—Bernhard R. Swick

[57] ABSTRACT

A method of producing a pigment-hydrophobic organic vehicle product which comprises:

A. providing an emulsion which comprises:
 1. an organic liquid selected from the group consisting of:
    (a) oleophilic resins
    (b) organic solvents and
    (c) mixtures thereof,
 2. an emulsification agent and
 3. water
B. forming a water slurry of a pigment,
C. admixing said emulsion with said pigment slurry,
D. forcing said emulsion and pigment slurry mixture through a concentration zone and
E. flushing said mixture with a hydrophillic organic vehicle.

13 Claims, No Drawings

PIGMENT PRODUCT

BACKGROUND OF THE INVENTION

Field of the Invention

This invention relates to a method for producing a pigment-organic vehicle product and the product produced thereby.

In the preparation of inks, paints, colored plastics, and the like, it is essential that the pigment be uniformly dispersed in the vehicle. There are many techniques for improving dispersibility of pigments such as adding the pigment in the form of a fine powder generally produced by drying and grinding the presscakes. However, powdered pigments are difficult to redisperse to obtain maximum dispersion.

While pigment presscake disperses more readily in an ink composition than dry pigment powders, nevertheless, due to the low solids content of the aqueous cake generally obtained by conventional processes, dispersion of untreated presscake in inks is not economically feasible because of the low pigment loading. Methods for preparing high solids presscakes from the conventional presscake obtained from a filter press are known to those skilled in the art. Such high solids presscakes allow for high pigment loading and are readily dispersible in inks but are difficult to handle and particularly are not readily pumpable.

Accordingly, the pigment is often "flushed" to transfer the pigment particles from the aqueous phase to a non-polar oil or resin phase. This assists in keeping pigment particles non-agglomerated and easier to dilute for ultimate use in inks or coatings. Flushing has been carried out for many decades by mixing pigment presscake with suitable types and quantities of "vehicles" which may be an oil, or a solution of resin or resins and other additives in a solvent. In the prior art, the transfer was effected by merely kneading the presscake and vehicle together until a major portion of the water has separated. Periodically the flushers have to be tilted to remove water from time to time as it breaks, i.e., becomes freed of pigment which has transferred to the oil phase.

It is a purpose of the instant invention to increase filter press capacity through increased bulk density of the material being filtered and to reduce flushing cycle time by significantly reducing the break phase portion of the flushing cycle.

U.S. Pat. No. 4,230,610, issued Oct. 28, 1980, to Falcione et al, assigned to Calgon Corporation, discloses the use of polyacrylates as dispersants for aqueous magnesium oxide pigment slurries prior to dewatering. The polyacrylate is obtained by neutralizing poly(acrylic acid) to a pH of from about 8 to about 12 with bases such as sodium or ammonium hydroxide. This changes the solubilization process properties of the polyacrylic acid resin from oleophilic to hydrophilic.

SUMMARY OF THE INVENTION

In accordance with the instant invention, organic pigments are phase transferred from an aqueous to a non-aqeuous phase, in discrete form, while still in the unconcentrated slurry through preferential wetting by surface contact between the pigment and a hydrophobic polymer emulsified in water. The process offers the advantages of increased filter press capacity through increased bulk density and decreased flusher cycle time by significantly reducing the break phase portion of the flushing cycle. Manufacturing experience with this material has demonstrated decreases in the phase transfer or break cycle of the flushing process of as much as 80 percent.

More specifically, this invention relates to a method of producing a pigment-hydrophobic organic vehicle product by A. providing an emulsion which comprises:
  1. an organic liquid selected from the group consisting of:
     (a) oleophilic resins
     (b) organic solvents, and
     (c) mixtures thereof,
  2. an emulsification agent and
  3. water
B. forming a water slurry of a pigment
C. admixing said emulsion with said pigment slurry,
D. forcing said emulsion and pigment slurry mixture through a concentration zone and
E. flushing said mixture with a hydrophobic organic vehicle.

DESCRIPTION OF THE PREFERRED EMBODIMENTS

In accordance with the instant invention, an oil in water emulsion is prepared by mixing an organic liquid selected from the group consisting of oleophilic resins, organic solvents and mixtures thereof, an emulsification agent, and water.

The emulsion comprises by weight about 50 to 90 percent water, 0 to about 40 percent resin, 0 to about 40 percent solvent and about 0.05 to 0.5 percent emulsification agent. While the emulsion may contain 0 percent of the resin or 0 percent of the solvent, it must contain at least about 2.0 percent by weight of either the resin or the solvent or mixture of both. A preferred emulsion contains 50 to 80 percent by weight water, 10 to 30 percent by weight resin, 10 to 30 percent by weight solvent, and 0.1 to 0.4 percent emulsification agent.

The resins employed are water-insoluble products of the type generally employed in the oil/ink industry. More specifically, the resins may be oleophilic resins: drying and semi-drying oils, litho varnishes (bodied linseed oil), rosins, dimerized rosins and esters of dimerized rosins; maleic, fumeric and phenolic modified rosins and rosin esters: aliphatic and aromatic hydrocarbon resins; polyindenes, cumarone/indene resins, alkyl aromatic resins, alkyd resins, urethane or polyamide modified alkyds; polyolefins, phthalate esters, castor, fish and linseed oils: heatset and quickset vehicles used in the printing ink industry; oil soluble fatty acids such as oleic, linoleic, etc.

The solvents employed may be the common solvents generally employed in the water-insoluble oil ink industry such as mineral oil and aliphatic petroleum distillates.

The emulsification agent may be any agent capable of emulsifying the above resins and solvents in water. They can be anionic, cationic, nonionic or amphoteric surface active agents. More specifically, they may be any oil ink industry compatible emulsifier which produces stable oil-in-water emulsions when the oil phase is a resin or resins, solvent or solvents or a combination of the two as defined above. These surface active agents would include amine alkyl sulfonates, bis-tridecyl esters of sodium sulfosuccinic acid, block copolymers of ethylene oxide and propylene oxide as well as many others.

Among the surface active agents which may be employed are the sodium salts of high molecular weight fatty alcohol sulfates, such as sodiumlauryl sulfate, sodium lignin sulfonates, the dioctyl ester sodium sulfosuccinic acid, polyalkylene oxide condensation products, such as polyethylene oxides, quaternary ammonium salts, the sodium sulfonates of oleic acid esters of aliphatic compounds, sodium salts of aryl alkyl polyether sulfonates, and the like. Examples of suitable surfactants which are to be regarded as illustrative, and not as limiting, are given in Table I:

TABLE 1

| No. | Chemical Class | Type | Trade Name | Percent Active |
|---|---|---|---|---|
| 1 | Sodium lauryl sulphate | Anionic | Duponol ME | 96 |
| 2 | Sodium dioctyl-sulfosuccinate | Anionic | Aerosol OT | 100 |
| 3 | Sodium salt of alkylaryl polyether sulfate | Anionic | Triton 770 | 25 |
| 4 | Polyalkylene glycol ether | Nonionic | Tergitol XD | 100 |
| 5 | Polyoxyethylated castor oil | Nonionic | Emulphor EL 749 | 97 |
| 6 | Sodium alkyl-naphthalene sulfonate | Anionic | Nekal BA 75 | 70 |

The emulsion is prepared by mixing in any conventional high shear mixing equipment such as a Cowles dissolver or a single blade mixer, a Banberry mill or a Gaullin homogenizer. The mixing may take place for a few minutes to several hours depending on the ultimate product desired.

A pigment slurry is then prepared by any known method.

This invention may be employed in conjunction with the production of many different pigments. Since the scientific nomenclature for dyes and pigments is very difficult, trade names are used almost exclusively in speaking of them. Examples of pigments for which this invention is applicable identified by the Color Index or C.I. names are as follows.

Pigment Red 1, Pigment Red 3, Pigment Red 4, Pigment Red 48:1, Pigment Red 48:2, Pigment Red 48:3, Pigment Red 48:4, Pigment Red 49:1, Pigment Red 49:2, Pigment Red 53:1, Pigment Red 52, Pigment Red 57, Pigment Red 81, Pigment Red 190, Pigment Orange 13, Pigment Orange 19, Pigment Orange 46, Yellow 12, Pigment Yellow 13, Pigment Yellow 14, Pigment Yellow 17, Pigment Yellow 27, Pigment Yellow 83, Pigment Green 7, Pigment Green 36, Pigment Blue 6, Pigment Blue 15:3, Pigment Blue 61.

An explanation of the well-known and well-used Color Index can be found on pages 20, 32, and 33 of *American Inkmaker* for January, 1984.

The emulsion and pigment slurry are then mixed using conventional mixing equipment such as described above with respect to the preparation of the emulsion. In general, the emulsion is added to the pigment strike liquor. The temperature of both the emulsion and pigment strike liquor will depend on the pigment employed. It should be the usual temperature at which the pigment slurry is concentrated and can range from 20° C. to 80° C. The emulsion should have a micelle size of about 0.1 to 5.0 microns but can range from 0.1 to 50 microns or larger. The mixing time after emulsion addition should be from about 15 minutes to two hours and the emulsion should be added during a first portion of this time period. The pigment slurry, after mixing with the emulsion, will generally have the following composition:

|  | Broad (%) | Preferred (%) |
|---|---|---|
| A. Water | 70–98.5 | 90–97.9 |
| B. Resin | 0–20 | .6–5 |
| C. Solvent | 0–20 | .6–5 |
| D. Emulsification Agent | 0.0015–.3 | 0.009–.05 |
| E. Pigment | 0.5–10 | 1.0–5.0 |

The slurry is then forced through a concentration zone, preferably a filter such as a plate and frame filter press. The filter cake is then flushed with the desired vehicle, depending on the ultimate pigment product desired, by conventional methods.

Any of the hydrophobic organic vehicles that are commonly used in printing ink and coating compositions may be employed in the method and composition of this invention. Such vehicles are represented by drying, semi-drying, and non-drying oils, litho varnishes, mineral oils, rosins, dimerized rosins, esters of dimerized rosins, aliphatic and aromatic hydrocarbon resins, alkyl-aromatic resins, maleic and fumeric-modified rosin, phenolic resin, phenolic-modified rosin esters, alkyd resins, urethane-modified alkyds, polyolefins, polyindenes, coumarone/indene resins, phthalate esters, castor oil, fish oil, linseed oil, gloss varnishes, and various heat-set, quick-set and steam-set vehicle systems.

The vehicle may be a solution of a resin or mixture of resins and other additives in a solvent.

Typical resins which can be advantageously employed in such solutions are illustrated in the following table:

TABLE II

| No. | Resin Type | Trade Name of Resin | Manufacturer |
|---|---|---|---|
| 1. | Isophthalic Alkyd based on Linseed Oil | AVO-791 | BASF |
| 2. | Polyamide Alkyd | Nylin 5 | Lawter |
| 3. | Phenolic Modified Rosin Ester of Abietic Acid | Beckacite 24–102 | Reichhold |
| 4 | Maleic Modified Rosin Ester of Abietic Acid | Filtrez 3790 | FRP |
| 5. | Pentaerythritol Ester of Dimeric Resin Acids | Pentalyn K | Hercules |
| 6. | Aliphatic Hydrocarbon | Piccovan AB165 | Hercules |
| 7. | Aromatic Hydrocarbon | LX-685-135 200 | Neville |
| 8. | Modified Hydrocarbon | Nevroz 1420 | Neville |
| 9. | Aromatic-Aliphatic Hydrocarbon | Petrovez 200 | Lawter |

As solvent in the resin-solvent type vehicle there may be employed aliphatic hydrocarbons, including petroleum distillates having a boiling range of 200° C. to 375° C., petroleum solvents such as mineral spirits and VMP nahtha, petroleum aromatic solvents, such as Solvesso No. 100, aromatic solvent having a boiling range 150° to 185° F. and a KB value of 91, aromatic solvents having a KB value of 92 to 100 such as xylene, and acyclic alcohols, ketones, and ethers, such as butanol, methyl isobutyl ketone, and "Methylcellosolve" (ethylene glycol monomethyl ether). The solvent mixtures will vary with the resins used and may be adjusted accordingly, but must be capable of dissolving the resin completely.

As specific embodiments and illustrative of the present invention, certain specific examples are set forth below. In the instant application all parts are by weight and all temperatures are in degrees Centigrade unless otherwise specified.

EXAMPLE 1

Six parts of a dodecylbenzenesulfonic acid emulsifying agent were mixed in a stainless steel tank for five minutes with 1815 parts of water using a high-speed Cowles sawtooth blade mixer. Four hundred four parts of a hydrocarbon solvent sold under the trademark Magiesol 47 were then added, followed by 201 part of a #0 bodied alkyd resin and the emulsion mixed for 30 minutes at 75° F. using the high-speed Cowles sawtooth blade mixer. The average diameter of the particles obtained was about 3 to 5 microns. This emulsion was then added to a 3 percent aqueous slurry containing 1008 parts of a Lithol Rubine pigment (Pigment Red 57) which had been heated to 75° F. over a 30 minute period while stirring using a paddle mixer. After stirring for one hour, the mixture was pumped to a 52 frame filter press. A portion of the above presscake containing 840 parts (28 percent) of pigment, 180 parts (6 Percent) of the alkyd resin, 360 parts (12 percent) of the Magiesol 47 solvent and 1620 parts (54 percent) water was divided into two halves. One half was mixed with 270 parts of a heat-set flushing varnish (vehicle A) comprised of 28 percent Magiesol 47 solvent and 72 percent maleic modified rosin ester of abietic acid in a sigma blade mixer at room temperature. After 15 minutes, the water was decanted with the temperature increasing to 29° F. due to frictional heat. The remaining half of the presscake was then added to the first half in the Sigma blade mixer along with sufficient amounts of vehicle A to bring the total amount of the vehicle to 350 parts after which the water was decanted. Approximately 76 percent of the water which was originally present in the presscake was removed by the decanting process. The mixture was then washed for one hour with cold tap water to reduce the salt content to less than 100 grains per gallon after which the mixture was heated to 93° F. for shade conversion. The mixture was then cooled with 100 parts of vehicle A and 24 parts of water. It was then let down with 638 parts of vehicle A, 72 parts of Magiesol 47 solvent and 8 parts of a 25 percent solution of antioxidant in Magiesol 47 solvent to give 2412 parts of the product. The total cycle time was reduced by 25% compared to a conventional process. Most of this reduction occurs in the break phase of flushing where the time was reduced 83% compared to a conventional process. The product was equal in all aspects of color qualities to a conventional product.

EXAMPLE 2

The procedure of Example 1 was followed with the exception that the oil-in-water emulsion comprised 201 parts of a #0 bodied alkyd resin, 121 parts of maleic modified rosin ester and 283 parts of the Magiesol 47 solvent forming a Heat-Set varnish. As a result the presscake contained 1620 parts (54 percent) water, 840 parts (28 percent) pigment and 540 parts (18 percent) Heat-Set varnish. When flushed as in Example 1, the total cycle time was reduced by 22% with the break phase being reduced by 75%.

EXAMPLE 3

Ten parts of a dodecylbenzenesulfonic acid emulsifying agent were mixed in a stainless steel tank for five minutes with 3249 parts of water using a high-speed Cowles sawtooth blade mixer. One thousand eighty-three parts of a heat set varnish (Vehicle B) comprising 507 parts hydrocarbon solvent sold under the trademark Magiesol 47, 358 parts of a #0 bodied alkyd resin and 218 parts of a modified maleic rosin ester and the emulsion mixed for 30 minutes at 75° F. using the high-speed Cowles sawtooth blade mixer. The average diameter of the particles obtained was about 3 to 5 microns. This emulsion was then added to a 3 percent aqueous slurry containing 1867 parts of a Diarylide Yellow (Pigment Yellow 12) which had been heated to 25° F. over a 30 minute period while stirring using a paddle mixer. After stirring for one hour, the mixture was pumped to a 52 frame filter press. A portion of the above presscake containing 628 parts (29 percent) of pigment and 368 parts of Vehicle B (17 percent) and 1169 parts water (54 percent) was divided into two halves. One half was mixed with 260 parts of heat-set flushing varnish (Vehicle A) in a Sigma blade mixer at room temperature. After 15 minutes, the water was decanted with the temperature increasing to 29° C. due to frictional heat. The remaining half of the presscake was then added to the first half in the Sigma blade mixer along with sufficient amounts of vehicle A to bring the total amount of the vehicle to 463 parts after which the water was decanted. Approximately 80 percent of the water which was originally present in the presscake was removed by the decanting process. The mixture was placed under vacuum (28 mm Hg) using 285 parts of a heat-set vehicle containing 64 parts of an aliphatic hydrocarbon resin and 36 parts of Magiesol 47 (Vehicle C) to control temperature below 55° C. until 98 percent of the water in the mixture was removed. It was then let down with 324 parts of Vehicle C, 326 parts of Magiesol 47 solvent, and 8 parts of a 55 percent solution of antioxidant in Magiesol 47 solvent to give 2406 parts of the product. The total cycle time was reduced 20% compared to a conventional process while most of the reduction occurred in the break phase which was reduced 61%. The product was equal in all aspects of color qualities to a conventional product.

EXAMPLE 4

Six parts of an amine alkyl aryl sulfonate (Ninate ® 411) emulsifying agent, 67 parts of a hydrocarbon solvent sold under the trademark Magiesol 47, 33 parts of a #0 bodied alkyd resin and 300 parts water were mixed for about one hour at 60° C. using a high-speed Cowles sawtooth blade mixer. The average diameter of the particles obtained was about 4 microns. This emulsion was then added to an aqueous slurry containing 2 percent Lithol Rubine (Pigment Red 57) which had been heated to 60° C. After stirring for one hour, the mixture was pumped to a filter press. The resulting presscake contained 45 percent water but had the same physical appearance as conventional 80 percent water presscake. When processed in a flusher, as described in Examples 1-3, an 80 percent reduction in cycle time of the break phase was achieved while total cycle time was reduced 24%. The final product has properties identical to a conventionally made flushing.

Having thus defined the invention what is claimed is:
1. A method of producing a pigment-hydrophobic organic vehicle product which comprises:
A. providing an emulsion which comprises:
 1. an organic liquid selected from the group consisting of:
    (a) oleophilic resins
    (b) organic solvents and (c) mixtures thereof,
2. an emulsification agent and
3. water
B. forming a water slurry of a pigment,
C. admixing said emulsion with said pigment slurry,
D. forcing said emulsion and pigment slurry mixture through a concentration zone and
E. flushing said mixture with a hydrophobic organic vehicle.

2. The process of claim 1 wherein said organic liquid (1) is an oleophilic resin (a).

3. The process of claim 1 wherein said organic liquid (1) is an organic solvent (b).

4. The process of claim 1 wherein said concentration zone is defined by a filter press.

5. The process of claim 4 wherein said organic liquid (1) is an oleophilic resin (a).

6. The process of claim 4 wherein said organic liquid (1) is an organic solvent (b).

7. The process of claim 4 wherein said emulsion and organic pigment slurry are mixed for about 0.25 hour to 2 hours, and said emulsion comprises about 50 to 90 percent water, about 0 to 40 percent of said resin, about 0 to 40 percent of said solvent, and about 0.05 to 0.5 percent of said emulsification agent, said emulsion containing a minimum of 2.0 percent of said resin or said solvent or mixture of both.

8. The process of claim 7 wherein said organic liquid (1) is an oleophillic resin (a) in an amount of about 10 to 40 percent by weight.

9. The process of claim 7 wherein said organic liquid (1) is an organic solvent (b) in an amount of about 10 to 40 percent by weight.

10. The process of claim 7 wherein said emulsion pigment slurry mixture prior to passage thru said concentration zone comprises about 70 to 98.5 percent water, about 0 to 20 percent resin, about 0 to 20 percent solvent, about 0.0015 to 0.3 percent emulsification agent and about 0.5 to 10 percent pigment, the composition containing at least about 2.0 percent by weight of said resin or said solvent or mixture of both.

11. The process of claim 10 wherein said organic liquid (1) is an oleophillic resin (a).

12. The process of claim 10 wherein said organic liquid (1) is an organic solvent (b).

13. The process of claim 10 wherein said organic liquid (1) is a mixture of an oleophilic resin (a) and an organic solvent (b).

* * * * *